(12) United States Patent
Uhler et al.

(10) Patent No.: US 8,167,103 B2
(45) Date of Patent: May 1, 2012

(54) FOUR-PASSAGE MULTIFUNCTION TORQUE CONVERTER

(75) Inventors: Adam Uhler, Sterling, OH (US); Philip George, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 722 days.

(21) Appl. No.: 12/316,220

(22) Filed: Dec. 10, 2008

(65) Prior Publication Data

US 2009/0157272 A1    Jun. 18, 2009

Related U.S. Application Data

(60) Provisional application No. 61/008,084, filed on Dec. 18, 2007.

(51) Int. Cl.
*F16D 25/10* (2006.01)
*F16H 45/02* (2006.01)

(52) U.S. Cl. ............... 192/3.25; 192/3.3

(58) Field of Classification Search ............ None
See application file for complete search history.

(56) References Cited

U.S. PATENT DOCUMENTS 7,028,820 B2 * 4/2006 Johann et al. ............... 192/3.26

OTHER PUBLICATIONS

U.S. Appl. No. 60/714,019, filed Sep. 2, 2005, Hemphill et al.

* cited by examiner

*Primary Examiner* — Rodney Bonck
(74) *Attorney, Agent, or Firm* — Simpson & Simpson, PLLC

(57) ABSTRACT

A torque converter including: an impeller clutch arranged to transmit, when closed, torque from a first cover for the torque converter to a shell for an impeller; a lock-up clutch arranged to transmit, when closed, torque from a second cover for the torque converter to an output hub; a release chamber for the impeller clutch, connected to a first channel; an apply chamber for the impeller clutch, connected to a second channel; an apply chamber for the lock-up clutch, connected to a third channel; and a torus connected to a fourth channel. The second, third, and fourth channels open to a space including a longitudinal axis for the torque converter and the space is arranged to receive an input shaft for a transmission. The first channel is arranged to connect to a line in a pump housing for a transmission.

11 Claims, 1 Drawing Sheet

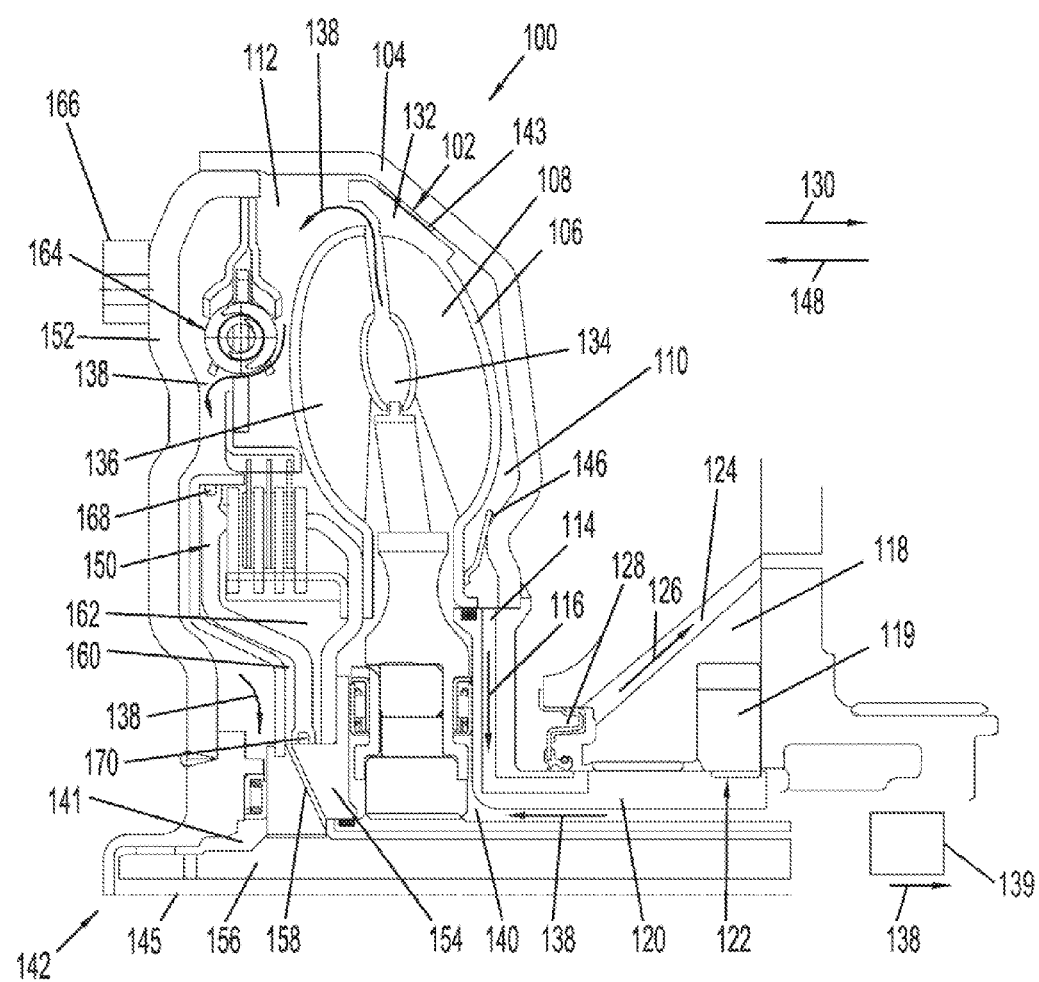

FOUR-PASSAGE MULTIFUNCTION TORQUE CONVERTER

CROSS-REFERENCE TO RELATED APPLICATIONS

This application claims the benefit under 35 U.S.C. §119 (e) of U.S. Provisional Application No. 61/008,084 filed on Dec. 18, 2007 which application is incorporated herein by reference.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a multi function torque converter having four passages, an increased cooling flow through the torus, and increased pressure differential across the impeller clutch.

BACKGROUND OF THE INVENTION

Three-passage configuration are know for torque converters with an impeller clutch and a lock-up clutch (multi-function torque converters), used to transmit torque from a cover for the torque converter to a turbine hub or other output element. Cooling oil is circulated from an oil cooler through the torus of the torque converter during operation in torque converter mode. Typically, the cooling flow also passes through the release chamber for the impeller clutch. Unfortunately, back pressure from the oil cooler increases pressure in the release chamber, reducing the pressure differential across the impeller clutch and adversely impacting operation of the clutch. As a result, the cooling flow must be undesirably reduced and/or the pressure in the apply chamber must be undesirably increased to offset the back pressure. In some configurations, the cooling flow passes through the closed impeller clutch in torque converter mode. Unfortunately, passing through the clutch undesirably restricts the cooling flow and exacerbates the back pressure problem.

Thus, there is a long-felt need for a multi-function torque converter configured to reduce undesirable back pressures and to increase cooling flow through a torus for the torque converter.

BRIEF SUMMARY OF THE INVENTION

The present invention broadly comprises a torque converter including: an impeller clutch arranged to transmit, when closed, torque from a first cover for the torque converter to a shell for an impeller; a lock-up clutch arranged to transmit, when closed, torque from a second cover for the torque converter to an output hub; a release chamber for the impeller clutch, connected to a first channel; an apply chamber for the impeller clutch, connected to a second channel; an apply chamber for the lock-up clutch, connected to a third channel; and a torus connected to a fourth channel. The second, third, and fourth channels open to a space including a longitudinal axis for the torque converter and the space is arranged to receive an input shaft for a transmission. The first channel is arranged to connect to a line in a pump housing for a transmission. In a preferred embodiment, the torque converter is arranged to rotationally connect to a pump for the transmission and the line in the pump housing leads to a sump for the transmission.

The second and fourth channels form a portion of a fluid circuit through the torus, the circuit bypassing the impeller clutch. In a preferred embodiment, fluid flows out of the release chamber through the first channel as the impeller clutch is closing. In a preferred embodiment the torque converter includes an elastically deformable element urging the impeller shell away from the cover. The impeller clutch is arranged to open in response to the urging of the elastically deformable element and a reduction in the flow rate for cooling oil flowing through the torus.

In a preferred embodiment, the apply chamber for the lock-up clutch is sealed with the exception of the third channel and the torque converter includes a release chamber for the lock-up clutch in fluid communication with the apply chamber for the impeller clutch.

The present invention also broadly comprises a method of operating an impeller clutch in a torque converter.

It is a general object of the present invention to provide a multi-function torque converter with an improved pressure differential across the impeller clutch.

It is another object of the present invention to provide a multi-function torque converter with improved cooling flow through the torus.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing FIGURE, in which:

The FIGURE is a partial cross-sectional view of a present invention torque converter.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

The FIGURE is a partial cross-sectional view of present invention torque converter 100. Torque converter 100 includes impeller clutch 102 arranged to transmit, when closed, torque from transmission side cover 104 to shell 106 for impeller 108. Clutch 102 is controlled by fluid pressures in release chamber 110, apply chamber 112, and other force generating elements (described infra). For example, the impeller clutch is arranged to close when pressure in the apply chamber reaches a specified level greater than opposing pressure or force in the release chamber. The release chamber is in fluid communication with, that is, connected to, channel 114 and fluid in the release chamber (shown by arrow 116) is flowable out of the release chamber through the channel 114. In particular, the fluid flows out of the release chamber through channel 114 as the impeller clutch is closing.

The torque converter is arranged to be connected to pump housing 118 for a transmission (not shown). Portion 119 for a pump for the transmission is rotationally connected to pump hub 120, for example, by connection 122 between the pump hub and the portion. By rotationally connected, or secured, we mean that the portion and the hub are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra.

Channel 114 is arranged to be in fluid communication with, or connected to, channel 124 in pump housing 118. Channel 124 is connected to a sump (not shown) for the transmission. In general, channel 124 enables fluid, as shown by arrow 126, with little or no back pressure toward the sump to prevent unseating seal 128. Thus, fluid in chamber 110 is pushed with nominal resistance from the chamber through channels 114 and 124 to the sump.

Clutch 102 closes by movement of core 132 (including impeller 108, torus 134, and turbine 136) in axial direction 130, resulting in contact of shell 106 with the cover. As a result, of this movement, the volume of chamber 110 is decreased. However, opposing fluid pressure in the chamber is virtually eliminated by the flow of fluid from chamber 110 through channels 114 and 124, addressing one of the problems noted supra. Specifically, the reduction of pressure in chamber 110 helps maintain a higher pressure differential across clutch 102, increasing the effectiveness of the fluid pressure in apply chamber 112 for the impeller clutch.

Cooling flow through torus 134, as shown by arrows 138, is needed to remove heat generated by operation of the torus and slippage of clutch 102. That is, cooling oil enters the torque converter through passage 140, for example, from oil cooler 139, and exits through passage 141. It should be understood that flow in the opposite direction also is possible in torque converter 100. Advantageously, the flow bypasses clutch 102. That is, the flow is not restricted by having to pass through the clutch. Cooling fluid that seeps through the closed impeller clutch, for example due to the porosity of friction material 143, is vented through channels 114 and 124. Channels 140 and 141 open to space 142 formed in the center of the torque converter. Space 142 includes longitudinal axis 145 and is arranged to receive input shaft 156 for the transmission.

Since channels 114 and 124 can only be used to vent chamber 110, torque converter 100 includes elastically deformable element 146 to open the impeller clutch for example, to operate the torque converter in idle disconnect mode. Element 146 urges the impeller shell in direction 148, away from cover 104. Element 146 applies a specified force in direction 148. When the force on the core in direction 130 is less than the specified force, for example, when the cooling flow is reduced through the torus (reducing fluid pressure in the apply chamber), element 146 opens the impeller clutch. Element 146 can be any such element known in the art, for example, a spring.

Torque converter 100 also lock-up clutch 150 arranged to transmit torque, when closed, from cover 152 to turbine hub 154. Clutch 150 is rotationally connected to hub 154, which is rotationally connected to input shaft 156 for the transmission. Channel 158 is used to supply and vent fluid to apply chamber 160 for the lock-up clutch. Channel 158 also opens to space 142. Thus, torque converter 100 is a four-passage (channels 114, 140, 141, and 158) device. In a preferred embodiment, release chamber 162 for the lock-up clutch is in fluid communication with the apply chamber for the impeller clutch. The lock-up clutch operates, as is known in the art, in response to pressure differentials between chambers 160 and 162. In another preferred embodiment, the torque converter includes damper 164 and cover 152 is connected to an engine (not shown) by lugs 166. In yet another preferred embodiment, chamber 160 is sealed with the exception of channel 158, for example, by seals 168 and 170.

It should be understood that torque converter 100 is not limited to the elements and configuration shown and that other combinations of elements and configurations are included in the spirit and scope of the claimed invention.

The present invention also includes a method of operating an impeller clutch in a torque converter. Although the method is depicted as a sequence of steps for clarity, no order should be inferred from the sequence unless explicitly stated. A first step flows fluid, from an oil cooler, between first and second channels in the torque converter and through a torus for the torque converter, the first and second channels opening to an apply chamber for the impeller clutch and the torus, respectively. A second step bypasses the impeller clutch with the flowing fluid. A third step vents fluid from a release chamber for the impeller clutch through a line in a pump housing for a transmission. A fourth step closes the impeller clutch. A fifth step transmits torque from a cover for the torque converter through the impeller clutch to a shell for an impeller.

In a preferred embodiment, the line in the pump housing leads to a sump for the transmission.

In a preferred embodiment, a sixth step applies a force, using an elastically deformable element, on the impeller clutch; a seventh step reduces the flow of fluid through the torus; and an eighth step opens the impeller clutch.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A torque converter comprising:
    an impeller clutch arranged to transmit, when closed, torque from a first cover for the torque converter to a shell for an impeller;
    a lock-up clutch arranged to transmit, when closed, torque from a second cover for the torque converter to an output hub;
    a release chamber for the impeller clutch, connected to a first channel;
    an apply chamber for the impeller clutch, connected to a second channel;

an apply chamber for the lock-up clutch, connected to a third channel; and, a torus connected to a fourth channel, wherein the second, third, and fourth channels open to a space including a longitudinal axis for the torque converter, wherein the space is arranged to receive an input shaft for a transmission, wherein the first channel is arranged to connect to a line in a pump housing for a transmission, wherein the torque converter is arranged to rotationally connect to a pump for the transmission and wherein the line in the pump housing leads to a sump for the transmission.

2. The torque converter of claim 1 wherein the second and fourth channels form a portion of a fluid circuit through the torus, the circuit bypassing the impeller clutch.

3. The torque converter of claim 1 wherein fluid flows out of the release chamber through the first channel as the impeller clutch is closing.

4. The torque converter of claim 1 further comprising an elastically deformable element urging the impeller shell away from the cover.

5. The torque converter of claim 4 wherein the impeller clutch is arranged to open in response to the urging of the elastically deformable element and a reduction in the flow rate for cooling oil flowing through the torus.

6. The torque converter of claim 1 wherein the apply chamber for the lock-up clutch is sealed with the exception of the third channel.

7. The torque converter of claim 1 further comprising a release chamber for the lock-up clutch in fluid communication with the apply chamber for the impeller clutch.

8. A method of operating an impeller clutch in a torque converter comprising the steps of:
    flowing fluid, from an oil cooler, between first and second channels in the torque converter and through a torus for the torque converter, the first and second channels opening to an apply chamber for the impeller clutch and the torus, respectively;
    bypassing the impeller clutch with the flowing fluid;
    venting fluid from a release chamber for the impeller clutch through a line in a pump housing for a transmission; and,
    closing the impeller clutch.

9. The method of claim 8 further comprising the step of transmitting torque from a cover for the torque converter through the impeller clutch to a shell for an impeller.

10. The method of claim 8 wherein the line in the pump housing leads to a sump for the transmission.

11. The method of claim 8 further comprising the steps of:
    applying a force, using an elastically deformable element, on the impeller clutch;
    reducing the flow of fluid through the torus; and,
    opening the impeller clutch.

* * * * *